United States Patent [19]

Miller

[11] 3,887,719
[45] June 3, 1975

[54] METHOD AND APPARATUS FOR HANDLING PROCESS CHEESE SPREAD
[75] Inventor: Roland E. Miller, Orangeville, Ill.
[73] Assignee: Kraftco Corporation, Glenview, Ill.
[22] Filed: Apr. 23, 1973
[21] Appl. No.: 353,789

Related U.S. Application Data
[63] Continuation-in-part of Ser. No. 96,766, Dec. 10, 1970, abandoned.

[52] U.S. Cl. .............. 426/517; 99/460; 99/464; 99/466; 426/414; 426/512; 426/518
[51] Int. Cl. ........................................ A23c 19/02
[58] Field of Search .......... 426/512, 515, 517, 414; 99/460, 461, 462, 463, 464, 465, 466; 270/58; 83/107; 93/58.2; 425/224

[56] References Cited
UNITED STATES PATENTS
| | | | |
|---|---|---|---|
| 2,361,775 | 10/1944 | Kraft | 426/414 |
| 2,907,109 | 10/1959 | Palmer | 425/224 |
| 3,479,024 | 11/1969 | Miller et al. | 270/58 |
| 3,552,281 | 1/1971 | Feick | 93/58.2 |
| 3,620,114 | 11/1971 | Chudyk | 83/107 |

Primary Examiner—David M. Naff
Attorney, Agent, or Firm—Fitch, Even, Tabin & Luedeka

[57] ABSTRACT

An apparatus and method for handling a sheet of a food product, such as a cheese product having limited strength characteristics, for division into slices includes distributing a flowable food product onto a chill roll so that it is formed into a sheet, separating the sheet from the chill roll, and transporting the sheet upon a conveyor away from the chill roll. The sheet is supported across its width and along its length while it moves toward apparatus for slitting the sheet into a plurality of adjacent longitudinal strips and for cutting the strips transversely into slices of desired length and width.

6 Claims, 2 Drawing Figures

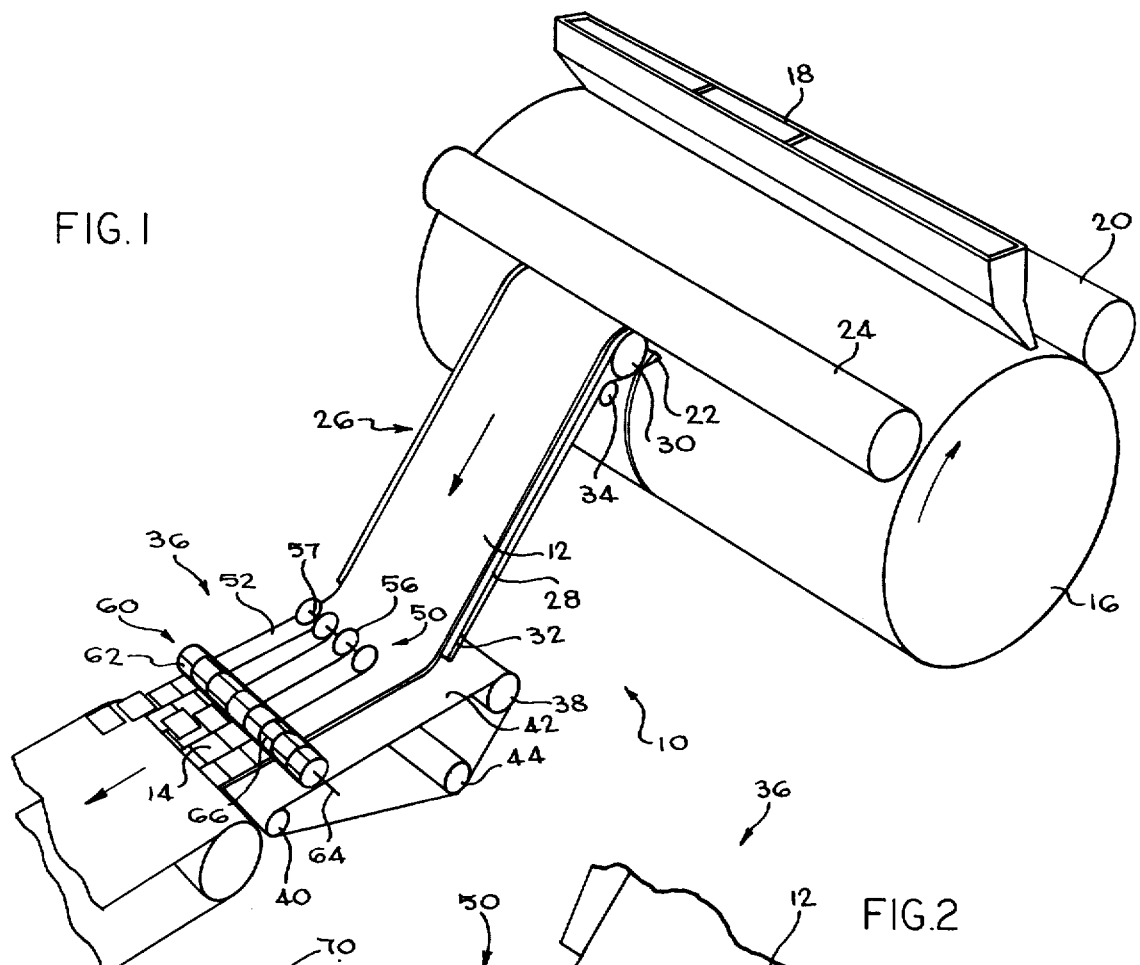
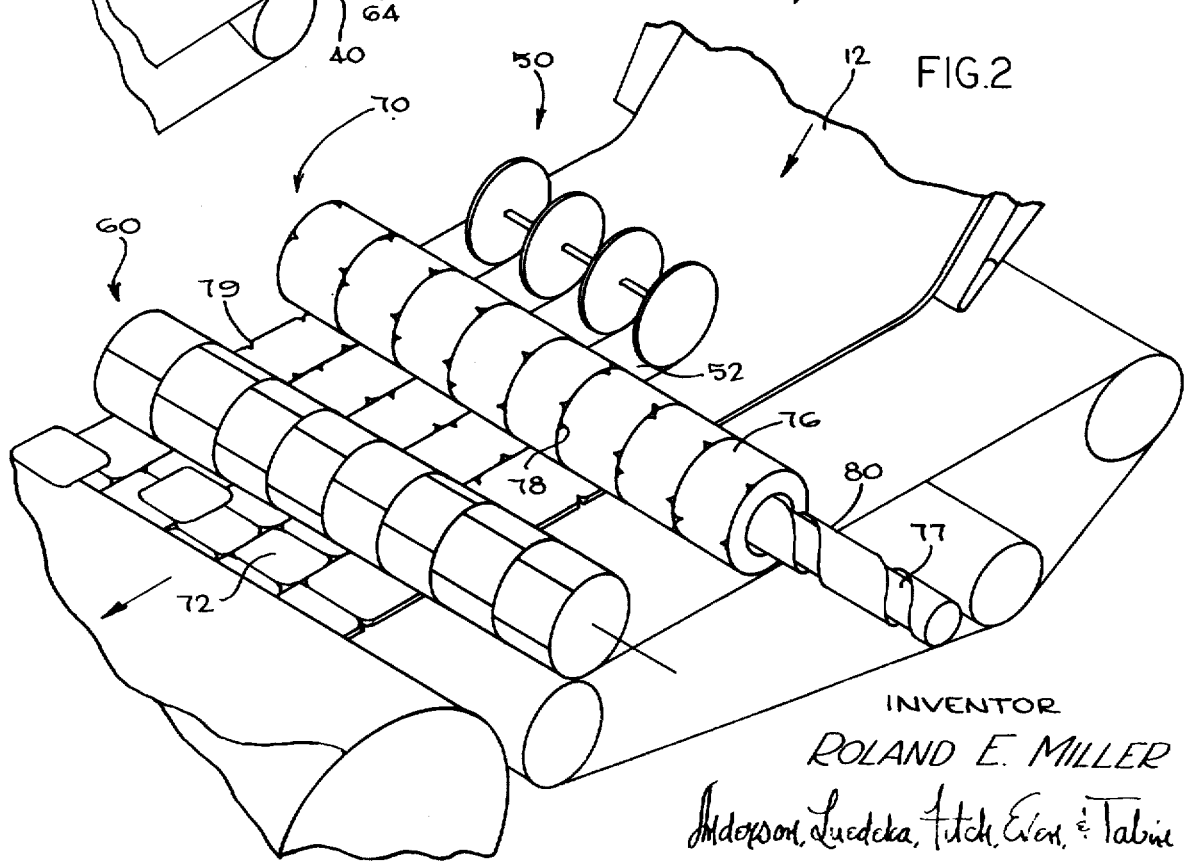

METHOD AND APPARATUS FOR HANDLING PROCESS CHEESE SPREAD

The present invention is a continuation-in-part of copending application Ser. No. 96,766 filed Dec. 10, 1970, now abandoned.

The present invention relates generally to an apparatus and method for handling a sheet of food commodity, such as cheese, having weak body characteristics. More particularly, the invention is directed to apparatus for supporting a sheet of a cheese product having a high moisture content resulting in weak body characteristics across its width and throughout its length after it has been formed from molten cheese upon a chill roll.

In U.S. Pat. No. 2,352,210, apparatus is disclosed for continuously producing a sheet of a cheese product and for cutting or slitting such a sheet to form it into longitudinal ribbons. In a commercial system embodying such apparatus, the cheese ribbons are superimposed and the stacked ribbons are cut to provide slices of predetermined length which are then packaged.

In U.S. Pat. No. 3,479,024, an automated system for making pre-sliced individually wrapped cheese slices is shown which includes the step of cooling a continuous sheet of molten cheese by passing it over a chill roll. As the sheet of cheese leaves the chill roll, it is slit to form continuous ribbons, each of which is then guided over suitable means and through a cutting station, wherein the ribbons are individually cut transversely of their length to form cheese slices. The slices are then converged into a row, individually wrapped and stacked.

Although the apparatus described in the above-mentioned patents are commercially useful and highly successful in the production of process cheese, such as process American cheese, they have not been adapted to the handling of a weak-bodied cheese such as occurs with high-moisture cheese products such as process cheese spread. Conventionally, a distinction is made among process cheese, process cheese food and process cheese spread. In process cheese, the moisture and fat are at levels close to the legal limit of the natural cheese used. Process cheese food contains not more than 44% moisture and not less than 23% milk fat and process cheese spread contains not less than 44% and not more than 60% moisture and not less than 20% milk fat. The high moisture in process cheese spread provides a softer texture to the product. This same quality, however, causes the material to have a generally weak body with low tensile strength which results in the product separating, tearing, and breaking during handling, particularly when it is being handled in the form of a thin sheet as from a chill roll. It would be desireable to handle process cheese spread off a chill roll for manufacture into slices but the aforementioned apparatus will not effectively handle process cheese spread for this purpose. While other apparatus have been provided for packaging slices of process cheese spread, such are not adapted to chill rolls nor to high speed production of individually wrapped slices of process cheese spreads. The difference in handleability of process cheese and process cheese spread is readily understood by those skilled in the art but it is difficult to characterize the differences by tests or physical properties. Accordingly, this specification uses the term process cheese spread to encompass those cheese products having like handleability after removal from a chill roll.

An object of the present invention is to provide an improved apparatus and method for handling a sheet of a process cheese spread off a chill roll for subsequent division thereof into slices.

A more specific object of the invention is to provide improved apparatus for handling off a chill roll and without separation, tearing or breaking a continuous sheet of a process cheese having a weak body of low tensile strength so that the product can be divided into slices of desired size and shape for packaging.

Another object of the invention is to provide apparatus for supporting a sheet of a process cheese spread having weak body, low tensile strength characteristics generally along its width and length so that the process cheese spread can be divided into slices of predetermined dimensions.

These and other objects of the invention are more particularly set forth in the following detailed description and in the accompanying drawing, in which:

FIG. 1 is a simplified, perspective view of one embodiment of apparatus particularly adapted for handling a sheet of process cheese spread in accordance with the practice of the present invention; and FIG. 2 is a simplified, perspective, fragmentary view of modified apparatus useful in the practice of the invention.

With reference to FIG. 1 of the drawing, there is shown apparatus generally designated by the reference numeral 10 for handling a sheet of process cheese spread 12 of limited strength characteristics for subsequent division thereof into individual slices 14 of desired size and shape. The apparatus 10 is generally useful in handling a food product which has the handling characteristics of process cheese spread. The apparatus is particularly suitable for handling weak bodied food products, such as for example process cheese spread, meat products, margarine, jelly and peanut butter, and particularly process cheese spread containing between about 44% and about 60% moisture and not less than 20% milk fat. However, the apparatus 10 could also be used to handle food products of relatively strong body. It is a particular feature of the apparatus 10 used in the practice of the invention that the sheet of cheese product 12 is supported across its width and along its extended length. Hence, the continuous, flexible sheet of cheese product 12 does not become separated, torn or otherwise damaged between its formation and its division into slices of cheese 14.

More particularly, and as seen in FIG. 1, the apparatus 10 includes a large chill or refrigerated roll or drum 16. A flowable or molten cheese product is distributed onto the chilled surface of the roll 16 from a hopper 18 extending entirely along the length of the roll. The roll 16 is supported for continuous rotation so that a continuous sheet of a process cheese spread product 12 is provided therefrom. Upon contact with the surface of the roll, the molten cheese product begins to cool and solidify, forming the sheet of cheese product 12 which clings to the roll and remains in engagement therewith around a substantial portion of its circumference. The molten cheese forms into a sheet in a period of time somewhat less than the period for a revolution of the roll. Thus, the sheet will remain on the roll for about three-quarters or more of the revolution, the sheet entering from the hopper 18 onto one of the upper quadrants of the chill roll 16 and being separated from the roll at the other of the upper quadrants.

As the formed sheet rotates on the roll beyond the vicinity of the hopper 18, and while it is still soft, it passes under a roll 20 disposed for rotation parallel thereto, the gap between the two rolls determining the ultimate thickness of the sheet of cheese 12.

As the sheet travels on the chill roll, it approaches a doctor blade 22 extending along the length of the chill roll 16 which removes the sheet from the surface of the chill roll. The doctor blade 22 is located ahead of the hopper 18 so that the surface of the chill roll is cleared for receipt of additional molten cheese product.

The separated cheese product is fed into a nip between a guide roll 24 and a take off conveyor 26. The guide roll is disposed in parallel relation to the chill roll 16. The guide roll 24 and take off conveyor 26 are rotated so as to remove the cheese product from the chill roll 16 in the form of a flexible sheet. The flexible sheet of process cheese spread product 12 is transported in a direction away from the chill roll 16 by the take off conveyor 26 at the same speed at which the chill roll rotates.

It is a particular feature of the present invention that the take off conveyor 26 supports the sheet of cheese product 12 along its extended length from the chill roll 16 and across the width thereof. Thus, the sheet is carried away from the chill roll with full support. As before mentioned, sheets of process cheese spread are of generally weak body and contain a high percentage of moisture. If they are not carried with proper support they will tend to separate, tear or break between the chill roll 16 and the apparatus for preparing slices from the sheet of cheese product. Thus, the take off conveyor 26 is particularly advantageous in that it allows the weakbodied, high-moisture process cheese spread to be handled in a manner such that it can be divided into individual slices for packaging.

In order that the continuous, flexible sheet of cheese product 12 is supported across its width and along its extended length during travel from the chill roll 16, the take off conveyor 26 comprises a belt 28 which is trained around a driven roller 30 and a nose bar 32. It is contemplated, however, that the belt 28 could be trained around the guide roll 24 to remove the cheese from the chill roll, the driven roller 30 being eliminated. A tensioning roller 34 may be provided to pick up slack in the belt 28. However, the roller 34 might be eliminated or positioned internally of the belt 28 if it tends to collect fats and other solids from the product that adheres to the belt 28, thereby contaminating the belt.

The driven roller 39 is disposed closely adjacent and parallel to both the chill roll 16 and the guide roll 24. The driven roller 30, which is actuated by suitable means, is located beneath the guide roll 24.

As the sheet of cheese product is separated from the chill roll 16 by the doctor blade 22, it passes between the guide roll 24 and the take off conveyor 26 and carried away on the belt 28. The flexible sheet of cheese product 12 is entirely supported upon the upper surface of the belt 28 and is not required to pass through any significant unsupported regions.

The nose bar 32 is disposed at the lower end of the belt run and is tapered at its lower end. The nose bar 32 has its axis parallel to the axis of the driven roller 30 but is disposed at a lower elevation so that the flexible sheet of cheese product 12 moves in a generally downward direction. The nose bar is carried in guides (not shown) which hold it in position, as will be hereinafter described.

The belt 28 continuously travels between the driven roller 30 and the nose bar 32, passing over the tensioning roller 34 which keeps the belt 28 taut. The take off conveyor 26 can be rapidly assembled and disassembled for purpose of cleaning and replacement by slipping the belt 28 over the nose bar 32.

At the lower end of the take off conveyor 26, adjacent the nose bar 32, is located a cutter conveyor 36 for receiving the sheet of cheese product 12 and conveying it in a direction away from the chill roll 16. The cutter conveyor 36 generally comprises an idler roller 38, a driven roller 40 and a continuous belt 42 entrained around the idler and driven rollers 38 and 40 for continuous travel. A tensioning roller 44 is provided between the idler and driven rollers 38 and 40 to maintain the belt 42 taut.

It is important that the transfer of the cheese from the take off conveyor 26 to the cutter conveyor 36 be effected without separation or tearing of the cheese. In the illustrated embodiment, this is accomplished in the manner following. As the take off conveyor 26 terminates at its lowermost point at the tapered nose bar 32, the take off conveyor 26 intersects the cutter conveyor 36 at an angle such that there is only a small gap between the continuously traveling belts 28 and 42. As the take off and cutter conveyors 26 and 36 are disposed closely adjacent one another, the sheet of cheese product 12 is substantially supported while passing therebetween. The belts 28 and 42 are fabricated from low-friction material and may actually contact one another. The tapered nose bar 32 permits minimizing of any space between the conveyors 26 and 36.

The cutter conveyor 36 has associated therewith means for slitting and cutting the sheet of cheese 12 to form individual slices 14. Although the sheet of cheese 12 may be formed into individual slices 14 at any point along the path of movement from the chill roll 16, it is presently preferred that the slices of cheese 14 be formed while the sheet of cheese 12 is passing along a substantially horizontal portion of the traveling belt 42. A slitter assembly 50 is employed in cooperation with the belt 42 for dividing the sheet of cheese product 12 into a plurality of adjacent longitudinal strips or ribbons of cheese 52 of uniform width. The slitter assembly 50 includes a plurality of slitting discs 56 carried upon a slitter shaft 57 mounted in bearings and rotated by any suitable means, the discs 56 being equally spaced along the shaft 57. The discs 56 are adapted to rotate so as to engage the sheet of cheese 12 and to divide the sheet along its width into the strips 52 while the sheet is supported across its width and along its length from the chill roll 16. Alternatively, the slitter assembly 50 could be disposed, for example, adjacent the guide roll 24 and if the driven roller 30 were eliminated as mentioned earlier, the slitting discs 56 would then divide the sheet 12 into the adjacent strips 52 at this point. The sheet 12 then being in the form of a plurality of adjacent strips could still be supported during transport in the manner just described.

Further associated with the cutter conveyor 36 is a cutter assembly 60 for dividing the longitudinal strips or ribbons of cheese 52 perpendicularly to their direction of travel into slices of cheese 14 of desired length. In the embodiment shown in FIG. 1, the cutter assembly 60 comprises a plurality of cylindrical sections 62 of substantially the same diameter carried upon and keyed to a common drive shaft 64 journaled in bearings for rotation. Each of the cylindrical sections 62 of the cutter assembly 60 carries a plurality of radially directed blades 66 spaced between the outer ends of the blades corresponding to the desired length of the individual cheese slices 14. The tangential velocity of the tips of the blades 66 equals the linear velocity of the cheese strip or ribbon 52 moving therebeneath. At the lower extent of their arcuate travel, the blades 66 cooperate with the continuous belt 42 of the cutter conveyor 36 to form the individual cheese slices by cutting the plural, longitudinal ribbons or strips of cheese perpendicularly. Preferably, the drive means for the cutter conveyor 36 also rotates the cutter assembly 60, thereby insuring synchronization between the two devices. The cutter assembly 60 of the type described is shown in U.S. Pat. No. 3,479,024. It should be apparent, however, that other suitable slitting and cutting assemblies can be employed for the purpose of forming individual slices of cheese 14 from the sheet of cheese 12.

After the slices of cheese 14 have been prepared, they are transported by the cutter conveyor 36 to a converger (not shown) which converges or combines into a single output line of individual cheese slices the plurality of adjacent rows of slices which are moving at a generally constant velocity. A converger particularly useful in handling cheese slices 14 of the type processed by the above-described apparatus is shown in U.S. Pat. No. 3,479,024.

The converger transfers the cheese slices moving in a single row to an output conveyor which carries the cheese into a wrapping and packing apparatus. There the slices of cheese 14 are preferably individually wrapped as they move in a single file row.

Turning now to FIG. 2 of the drawing, there can be seen a second embodiment of the apparatus 10 containing all the elements above described in conjunction with the embodiment of FIG. 1, but further including a forming assembly 70 for producing modified slices of cheese, such as slices 72 having rounded corners. The forming assembly 70 includes a plurality of sections 76 of generally cylindrical shape carried upon a shaft 77 journaled in suitable bearings for rotation thereof. The sections 76 each contain a plurality of protuberances 78 about the respective peripheries thereof at the ends of the cylindrical sections. These protuberances 78 are substantially triangular in shape and are arranged such that the protuberances are synchronized for rotation by suitable means along with the blades 66 mounted upon the sections 62 of the cutter assembly 60.

After the ribbons or strips of cheese 52 have been formed by the slitter assembly 50, they pass next through the forming assembly 70, whereby the protuberances 78 form a plurality of notches 79 of generally corresponding triangular shape along the edges of the longitudinal ribbons or strips 52. Then the ribbons or strips 52 having triangular notches 79 along the edges thereof are passed through the cutter assembly 60, where they are divided further into slices of cheese 72 having rounded corners. The blades 66 of the cutter assembly 60 cut the ribbons or strips between corresponding notches 79 on opposite edges of the ribbons. A scrap discharge screw 80 is provided to remove from the forming assembly 70, in a direction away from the direction of travel of the ribbons or strips, the material resulting from the formation of the notches 79 along the edges of the ribbons.

Such a forming assembly 70 can be employed to provide slices of cheese of still other configurations, e.g., triangular shaped slices. It is contemplated that the assembly 70 may be provided in the apparatus 10 with means for pivoting the assembly away from the path of travel of the strips of cheese when it is desired that the assembly 70 be inoperative.

Hence, in operation of the apparatus 10 of the present invention, molten cheese is distributed from the hopper 18 onto the chill roll 16, which is continuously rotating. As the molten cheese travels with the chill roll 16, it sets to form a sheet of cheese product 12, the thickness of which is determined by the distance between the chill roll 16 and the roll 20. After the cheese has rotated through an angle of somewhat less than 360° upon the chill roll, the sheet of cheese is separated from the chill roll by the doctor blade 22. The guide roll 24 and the take off conveyor 26 cooperate to direct the sheet away from the chill roll 16 for subsequent division thereof while supporting the sheet across its width and along its length from the chill roll. The take off conveyor 26 transfers the sheet to the cutter conveyor 36, upon which the sheet is formed by the slitter assembly 50 into a plurality of longitudinal strips or ribbons 52 of cheese while it is supported across its width and along its length.

In one embodiment of the invention, the ribbons or strips 52 are next cut perpendicularly to their direction of travel into slices of cheese by the cutter assembly 60. In a second embodiment, the ribbons 52 are provided with notches 79 along their longitudinal edges by a forming assembly 60 in cooperating relation with the cutter conveyor 36 so that the slices 72 subsequently formed have rounded corners. The formed slices 14 (or slices 72 having rounded corners) are converged into a single file row of slices and are individually wrapped and packed.

It should be understood that although process cheese spread has been described in connection with the illustrated embodiment, the method and apparatus of the present invention are suitable for handling other food products having a generally weak body and low tensile strength when formed in a sheet. As mentioned previously, such other products might include, for example, meat products, margarine, jelly and peanut butter.

Thus, the present invention provides an improved apparatus and method for handling a sheet of a food commodity having limited strenth characteristics. The apparatus and method permit handling a sheet of high-moisture, weak-bodied cheese product, such as process cheese spread, for the subsequent division thereof. The cheese product can be supported by the apparatus of the invention such that the cheese does not separate, tear or break during handling.

While one specific form of the invention has been shown and described, it should be apparent that various modifications could be made therein without departing from the scope of the invention. For example, instead of employing a converger to form a single file row of slices of cheese after they have been prepared, the slices might be directly stacked and wrapped in packages by an automated operation for each ribbon or strip of cheese.

Various of the features of the invention are set forth in the following claims.

I claim:

1. A method of handling a process cheese spread containing from about 44% to about 60% moisture, which when formed into a sheet has low tensile strength, for division thereof into slices, comprising the steps of forming the process cheese spread into a sheet by distributing the cheese spread in a flowable state onto a top portion of a rotating chill roll, separating a sheet of the cheese spread from the chill roll at another top portion thereof after it has remained on the chill roll for a period of time less than the period for one revolution but more than the period of three-quarters of one revolution of the roll, guiding said sheet upwardly between a guide roll and a first conveyor means, substantially reversing the direction of travel of said sheet, conveying said sheet of cheese spread downwardly and away from the chill roll on said first conveying means, supporting the cheese spread across its width and along its length substantially from beneath while it is being conveyed on said first conveyor means, transferring the cheese spread from said first conveying means to a second substantially horizontal conveying means disposed below said first conveying means, supporting the cheese spread substantially across its width and along its length during transfer from said first conveying means to said second conveying means, said substantial support during transfer being effected by tapered bar means located at the terminus of said first conveyor means adjacent said second conveyor means, conveying the cheese spread while supporting it across its width and along its length substantially from beneath in a direction away from the chill roll on said second conveying means, slitting the cheese spread into a plurality of adjacent longitudinal strips while the cheese spread is supported across its width and along its length after removal from said chill roll, and cutting the longitudinal cheese spread strips tranversely so as to provide slices of desired length and width, said cutting occurring while the cheese spread is conveyed on said second conveying means.

2. The method in accordance with claim 1 wherein the process cheese spread is conveyed away from the chill roll at the same speed at which the roll rotates.

3. The method in accordance with claim 1 further comprising forming spaced apart notches along the edges of each of the plurality of adjacent longitudinal strips to provide the slices with rounded corners, said forming of notches occurring while the cheese spread strips are conveyed on said second conveying means.

4. Apparatus for handling a process cheese spread containing from about 44% to about 60% moisture, which when formed into a sheet has low tensile strength, for division thereof into slices, comprising a chill roll adapted to receive the process cheese spread in a flowable state and to rotate with the cheese spread thereupon until the cheese spread has set into a sheet, means for separating the cheese spread sheet from near the top of the chill roll, said separating means comprising a doctor blade disposed adjacent the chill roll along the length thereof and adapted to remove the cheese spread sheet from the chill roll and a rotating member positioned adjacent thereto and having its axis parallel to the axis of the chill roll and being above and adjacent a first conveyor means and adapted to guide the cheese spread sheet from the chill roll onto said first conveying means, first conveying means adjacent the roll for conveying the cheese spread in a direction downwardly and away from the separating means, second substantially horizontal conveying means disposed below said first conveying means for conveying the cheese spread in a direction away from the chill roll, both conveying means supporting the cheese spread across its width and along its length substantially throughout the conveying, said first conveying means including tapered bar means at the lower end thereof for effecting a transfer of the cheese spread to said second conveying means without separation or tearing thereof, slitting means adjacent either of said conveyor means at a point where the cheese spread is in the form of the sheet for dividing the cheese spread into a plurality of adjacent longitudinal strips while it is supported across its width and along its length, and cutting means adjacent the second conveying means for transversely dividing the longitudinal strips carried thereon so as to provide slices of desired length and width.

5. The apparatus in accordance with claim 4 wherein said first conveying means comprises a roller at the end thereof adjacent the chill roll, said roller adapted to cooperate with said rotating member to receive the cheese spread; a tapered bar having its axis parallel to the axis of the roller and spaced downwardly and outwardly from the chill roll; and a belt disposed around the roller and the bar for transporting the cheese spread in a direction downwardly and away from the chill roll, said tapered bar being disposed closely adjacent said second conveying means to effect said transfer of the cheese spread without separation or tearing thereof, and means for driving said first conveying means such that the cheese spread is conveyed thereon at the same speed at which the chill roll rotates.

6. The apparatus in accordance with claim 4 further comprising means adjacent said second conveying means for forming spaced apart notches along the edges of each of the plurality of adjacent longitudinal strips carried thereon to provide rounded corners on the slices.

* * * * *